No. 806,312. PATENTED DEC. 5, 1905.
J. G. BARBOUR.
BRICK MACHINE ATTACHMENT.
APPLICATION FILED MAR. 6 1905.

WITNESSES
Jos. J. Hosler.
L. M. Bond.

INVENTOR
James G. Barbour.

BY
F. W. Bond
ATTORNEY

UNITED STATES PATENT OFFICE.

JAMES G. BARBOUR, OF CANTON, OHIO, ASSIGNOR TO THE METROPOLITAN BRICK COMPANY, OF CANTON, OHIO, A CORPORATION.

BRICK-MACHINE ATTACHMENT.

No. 806,312.　　　　Specification of Letters Patent.　　　　Patented Dec. 5, 1905.

Application filed March 6, 1905. Serial No. 248,454.

*To all whom it may concern:*

Be it known that I, JAMES G. BARBOUR, a citizen of the United States, residing at Canton, in the county of Stark and State of Ohio, have invented certain new and useful Improvements in Brick-Machine Attachments; and I do hereby declare that the following is a full, clear, and exact description of the same, reference being had to the annexed drawings, making a part of this specification, and to the figures of reference marked thereon, in which—

Figure 1:
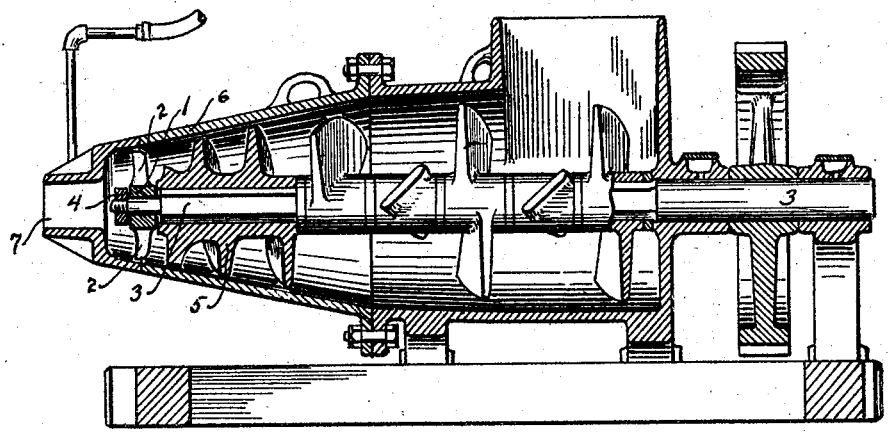
Figure 2:
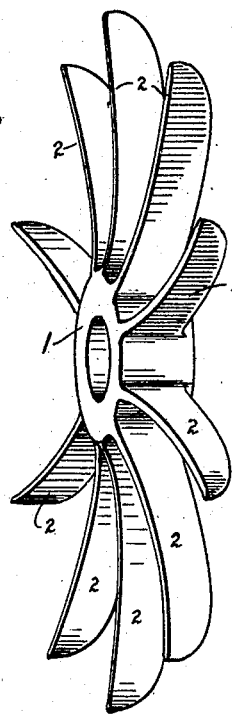

Figure 1 is a horizontal vertical section showing the auger portion of a brick-machine and illustrating my attachment connected thereto. Fig. 2 is a detached and enlarged view of the attachment.

The present invention has relation to brick-machine attachments designed to be attached to the auger or forced-feed portions of the machine proper and is for the purpose of breaking up the lamination of the clay, which lamination is produced by the rotation of the auger-blades, and leaves the flow of clay in what might be termed "spiral strata" by reason of which the brick produced from the flow of clay when burned are liable to crack on account of the lamination produced by the auger-blades. In order to overcome this objection, I provide the spider-hub 1, which spider-hub is provided with the radial blades 2. The spider-hub 1 is loosely mounted upon the forward end of the auger-shaft 3 and is held in proper position by means of the screw-threaded nut 4 or its equivalent. By loosely mounting the hub 1 upon the auger-shaft 3 the auger-shaft 3 will rotate without imparting rotary movement to the spider-hub 1 and the radial blades 2.

The auger 5 is of the usual construction and of course is located within the casing 6 in the usual manner and the die 7 located so that the flow of clay will pass through said die to give it the proper form to be cut into brick or other articles designed to be formed from clay or other plastic material. The auger-casing and die form no particular part of the present invention, except that my attachment is to be employed in connection with said parts. It is well understood that by the rotation of the auger the clay contained in the casing 6 is moved toward the die and a partial rotation of the clay or plastic material is imparted or may be imparted to the clay; but after the clay or plastic material has passed the extreme forward end of the auger the flow of clay or plastic material is forced through the die without any rotation, and by loosely mounting the hub 1 together with the radial blades 2 the flow of clay is severed into strips or segments, which strips or segments are brought in close contact with each other during the time the clay passes through the die, by which arrangement the spiral strata formed by the rotation of the auger-blades is removed and the body of clay or plastic material after having passed through the die is united and the spiral lamination entirely removed.

I have illustrated the attachment mounted upon the auger-shaft; but this feature may be dispensed with, as it will be understood that all that is necessary is to locate between the forward end of the auger and the rear portion of the die non-rotatable bars, which bars may be held as illustrated or they may be differently held without departing from the nature of my invention.

Having fully described my invention, what I claim as new, and desire to secure by Letters Patent, is—

In a brick-machine attachment for the purpose described, the combination of a casing and die, a shaft rotatable within the casing, and an auger mounted upon said shaft, a hub provided with radial bars, said hub loosely mounted upon the auger-shaft and located intermediate the forward end of the auger and at the rear of the die, substantially as and for the purpose specified.

In testimony that I claim the above I have hereunto subscribed my name in the presence of two witnesses.

JAMES G. BARBOUR.

Witnesses:
　J. A. JEFFERS,
　F. W. BOND.